United States Patent [19]
Harada et al.

[11] Patent Number: 5,721,879
[45] Date of Patent: Feb. 24, 1998

[54] EMULATOR DEDICATED ONE-CHIP MICROCOMPUTER

[75] Inventors: Hisashi Harada; Shinichi Hirose, both of Itami, Japan

[73] Assignee: Mitsubishi Denki Kabushiki Kaisha, Tokyo, Japan

[21] Appl. No.: 537,489

[22] Filed: Oct. 2, 1995

[30] Foreign Application Priority Data

Nov. 4, 1994 [JP] Japan .................................. 6-271530

[51] Int. Cl.⁶ .................................................. G06F 17/00
[52] U.S. Cl. .................................................. 395/500
[58] Field of Search ...................................... 395/500

[56] References Cited

U.S. PATENT DOCUMENTS

| | | | |
|---|---|---|---|
| 4,277,827 | 7/1981 | Carlson et al. | 395/500 |
| 4,484,266 | 11/1984 | Becker et al. | 395/500 |
| 5,228,039 | 7/1993 | Knoke et al. | 395/183.04 |
| 5,559,996 | 9/1996 | Fujioka | 395/500 |

*Primary Examiner*—Vincent N. Trans
*Attorney, Agent, or Firm*—Lowe, Price, LeBlanc & Becker

[57] ABSTRACT

An emulator dedicated one-chip microcomputer which can emulate without making any malfunction or without being subject to influences of noise even at low voltage, for example, when line voltage is about 1.8V, which is equipped with a level shifter 25 for converting the voltage level of signals given from the internal circuit bus 10 to the output circuit 4 from the voltage level of the external power supply VCC to the voltage level of the emulator power supply VCCA when the external power supply VCC and the emulator power supply VCCA equivalent to the voltage level at which the emulator 2 operates are supplied and an output circuit 4 outputs signals on the internal circuit bus 10 to the emulator 2 via a plurality of signal lines 7, 8, 9, and which is configured to allow the output circuit 4 to operate when the emulator power supply VCCA is supplied.

4 Claims, 6 Drawing Sheets

EMULATOR DEDICATED ONE-CHIP MICROCOMPUTER

BACKGROUND OF THE INVENTION

1. Field of the Invention

This invention relates to a one-chip microcomputer dedicated to an emulator, which is connected to an emulator and used for program development of one-chip microcomputer.

2. Description of the Related Art

In developing a program of microcomputers (hereinafter called "MCU"), when the state of internal circuits of MCU, for example, information such as contents of RAMs, contents of registers, or contents of program counters of MCU (addresses on the MCU program) can be monitored every time one instruction of MCU is executed, it will be extremely effective for debugging the program and will greatly improve the program developing efficiency of MCU. In this way, monitoring the information of MCU as mentioned above is called emulation and the device to be used for this purpose is called an emulator, and the whole system is called an emulation system.

The MCU used for such emulation system is equipped with an interface for outputting information such as addresses, data, etc. to the emulator and for receiving an input from the emulator and therefore becomes an MCU dedicated to emulators (hereinafter called "emulator dedicated MCU"). There is no functional difference between the MCU mounted in actual products and the emulator dedicated MCU but the former only differs from the latter in that the built-in ROM is replaced with the built-in interface in the latter.

Operating the portable equipment including MCU at low voltage is able to extend the life of the primary battery such as a manganese dry battery or an alkaline battery, or changing the power supply in the portable equipment from serial connection of three batteries to that of two batteries for the secondary battery as represented by a Ni-Cd battery has reduced the size and weight of the portable equipment. In order to improve the program development efficiency of MCU which needs this kind of low-voltage operation, an emulator dedicated MCU and an emulator which operate at low voltage are required, and in addition, intercommunication between the emulator dedicated MCU and the emulator must also be enabled even in the operation state at low voltage.

Next, explanation will be made on a conventional embodiment. In the following conventional embodiment, an emulation system for 8-bit MCU which can emulate at the power supply voltage of the MCU from 2.5V to 5.5V will be described. It is assumed that the access area of the 8-bit MCU is 64K bytes.

FIG. 1 is a block diagram showing a configuration example of the conventional emulation system, in which numeral 1 denotes an emulator dedicated MCU, 2 an emulator, 3 a power feeder for supplying the external power supply VCC to the emulator via a terminal 3T.

To the emulator dedicated MCU 1, various internal circuits (CPU, etc.) similar to those of general MCU are built in, as well as an output circuit 4 and an input circuit 5. The various internal circuits are connected to the output circuit 4 and the input circuit 5 through a bus (hereinafter called the "internal circuit bus") for various signals shown by numeral 10.

The emulator dedicated MCU 1 and the emulator 2 are connected with signal lines shown by numerals 8, 7, 8 and 9. Numeral 8 shows a signal line with which the emulator 2 detects voltage of the external power supply VCC (hereinafter called the "power supply detection signal line"), 7 a data bus for carrying out intercommunication between the emulator dedicated MCU 1 and the emulator 2, 8 an address bus for carrying out intercommunication between the emulator dedicated MCU 1 and the emulator 2, 9 a bus for various control signals for carrying out intercommunication between the emulator dedicated MCU 1 and the emulator 2 (hereinafter called "control signal bus"), respectively.

It is assumed that the emulator dedicated MCU 1 is mounted on an evaluation substrate or a prototype substrate and external power supply VCC is supplied from the evaluation substrate or prototype substrate via the power feeder 3 and the terminal 3T of the emulator dedicated MCU 1. In addition, the number of bits of the output circuit 4 and the input circuit 5 should correspond to the number of data, addresses and control signals outputted to the emulator 2, respectively.

Next, explanation will be made on the operation of the emulation system to which a conventional emulator dedicated one-chip microcomputer of the above-mentioned configuration is assembled. On the emulator 2, a program for MCU to be mounted on actual products is loaded from a flexible disc, etc. In order for the emulator dedicated MCU 1 to execute the program loaded on the emulator 2, the program must be taken into the emulator dedicated MCU 1 itself. Therefore, description will be made on this operation at first.

Description will be made on the operation for executing an instruction when the instruction for fetching the data into the CPU stored in an address of a memory is included in the above-mentioned program. First of all, the instruction is outputted from the emulator 2 and the emulator dedicated MCU 1 receives the instruction from the interface which is built in in place of the ROM. By this, the emulator dedicated MCU 1 is able to execute the instruction received from the interface in the same manner as in the case where the general MCU reads the instructions from the ROM and executes them.

Specifically, from the emulator dedicated MCU 1, the address of the data to be processed is outputted via the internal circuit bus 10, the output circuit 4 and the address bus 8 to execute the instruction received from the interface, and inputted to the emulator 2. At this time, a control signal is also outputted via the internal circuit bus 10, the output circuit 4 and the control signal bus 9 and inputted to the emulator 2. The emulator 2 which has received the address and control signals outputs the data stored in the address. This data is taken into the CPU (not illustrated) of the emulator dedicated MCU 1 via the data bus 7, the input circuit 5 and the internal circuit bus 10. The above-mentioned operation is executed in one or a few cycles of the internal clock of the emulator dedicated MCU 1.

By repeating these operations, the program is executed. However, this program is not usually terminated by one instruction but comprises an extremely large number of instructions. In the program in which such a large number of instructions are executed, it is extremely difficult to find program mistakes (bugs) and therefore, a system configuration in which the contents of the internal circuit bus 10 is stored in the emulator 2 for each internal clock of the emulator dedicated MCU 1 and are allowed to be traced upon completion of program execution is adopted for the emulation system.

The emulation system is also configured to enable temporary stop of the program execution for every instruction without destroying the internal state of the emulator dedicated MCU 1 so that the state of the internal circuit for the emulator dedicated MCU 1, that is, the state of CPU, the contents of various registers, or contents of RAM can be confirmed in the course of program execution.

By the way, for example, when the external power supply VCC is 2.5V, delay occurs in the output circuit 4 due to the small driving capabilities as compared with the case of 5V. To prevent malfunction, it is necessary to consider delay time that matches the voltage of the external power supply VCC for this kind of delay. Consequently, the emulator 2 is configured to accommodate the delay at the output circuit 4 due to the low voltage of the external power supply VCC by detecting the voltage of the external power supply VCC via the power supply detection signal line 6 and carrying out various types of processing with the corresponding delay time taken into account.

However, in case of this kind of system, because the delay becomes extremely large when voltage of the external power supply VCC becomes as low as 1.8V, or the interface portion on the side of the emulator dedicated one-chip microcomputer must be able to operate in the voltage range from 5V or higher to 1.8V, it is unable to meet the requirements with the above-mentioned technique. It is, therefore, extremely difficult presently to develop a program of the MCU operating at 1.8V by using a conventional emulator system and emulator dedicated one-chip microcomputer.

When, for example, the emulator dedicated MCU is able to operate at 1.8V, the threshold voltage of digital signals "1" and "0" becomes about 0.9V. However, under this condition, when the power supply of about 5V which is relatively higher than that of the emulator dedicated MCU 1 is supplied to the emulator 2, even when the voltage noise which does not constitute any serious problem in the emulator 2 has a possibility to exceed the threshold value of 0.9V in the emulator dedicated MCU 1, generating a fear of malfunction.

SUMMARY OF THE INVENTION

In view of the foregoing, it is an object of this invention to provide an emulator dedicated one-chip microcomputer which can emulate without making any malfunction or without being subject to influences of noise even the power supply is as low as 1.8V.

The emulator dedicated one-chip microcomputer is supplied with an external power supply of a first voltage level and a power supply of a second voltage level equivalent to the voltage level at which the emulator operates, and is provided with a level shifter for converting the voltage level of signals given to the output circuit from the internal circuit bus from the first voltage level to the second voltage level when the output circuit outputs signals on the internal circuit bus to the emulator via a plurality of signal lines, and the output circuit operates by being supplied with the power supply of the second voltage level.

In the emulator dedicated one-chip microcomputer according to this invention, the voltage level of the signal given to the output circuit from the internal circuit bus is converted by the level shifter from the first voltage level which is the voltage level of the external power supply to the second voltage level at which the emulator operates when the output circuit outputs signals on the internal circuit bus to the emulator via a plurality of signal lines. The output circuit outputs the signal of the second voltage level to the emulator because it is operated when the power supply of the second voltage level is supplied.

The emulator dedicated one-chip microcomputer according to this invention is supplied with the external power supply of the first voltage level and the power supply of the second voltage level, and has a level shift function equipped in the input circuit for converting the signal voltage level from the second voltage level to the first voltage level and outputting signals to the internal circuit bus when the signals outputted from the emulator to a plurality of signal lines are inputted.

In addition, in the emulator dedicated one-chip microcomputer according to this invention, the voltage level of the signal is converted from the second voltage level to the first voltage level by the input circuit and are outputted to the internal circuit bus when signals outputted from the emulator to a plurality of signal lines are inputted.

The above and further objects and features of the invention will more fully be apparent from the following detailed description with accompanying drawings.

BRIEF DESCRIPTION OF THE DRAWINGS

FIG. 8 is a circuit diagram showing a configuration example of an input circuit with level shift function of the second embodiment of an emulator dedicated one-chip microcomputer according to this invention.

DESCRIPTION OF THE PREFERRED EMBODIMENTS

This invention will be described in further detail with reference to the accompanying drawings showing the embodiments thereof.

[First Embodiment]

Figure 2:
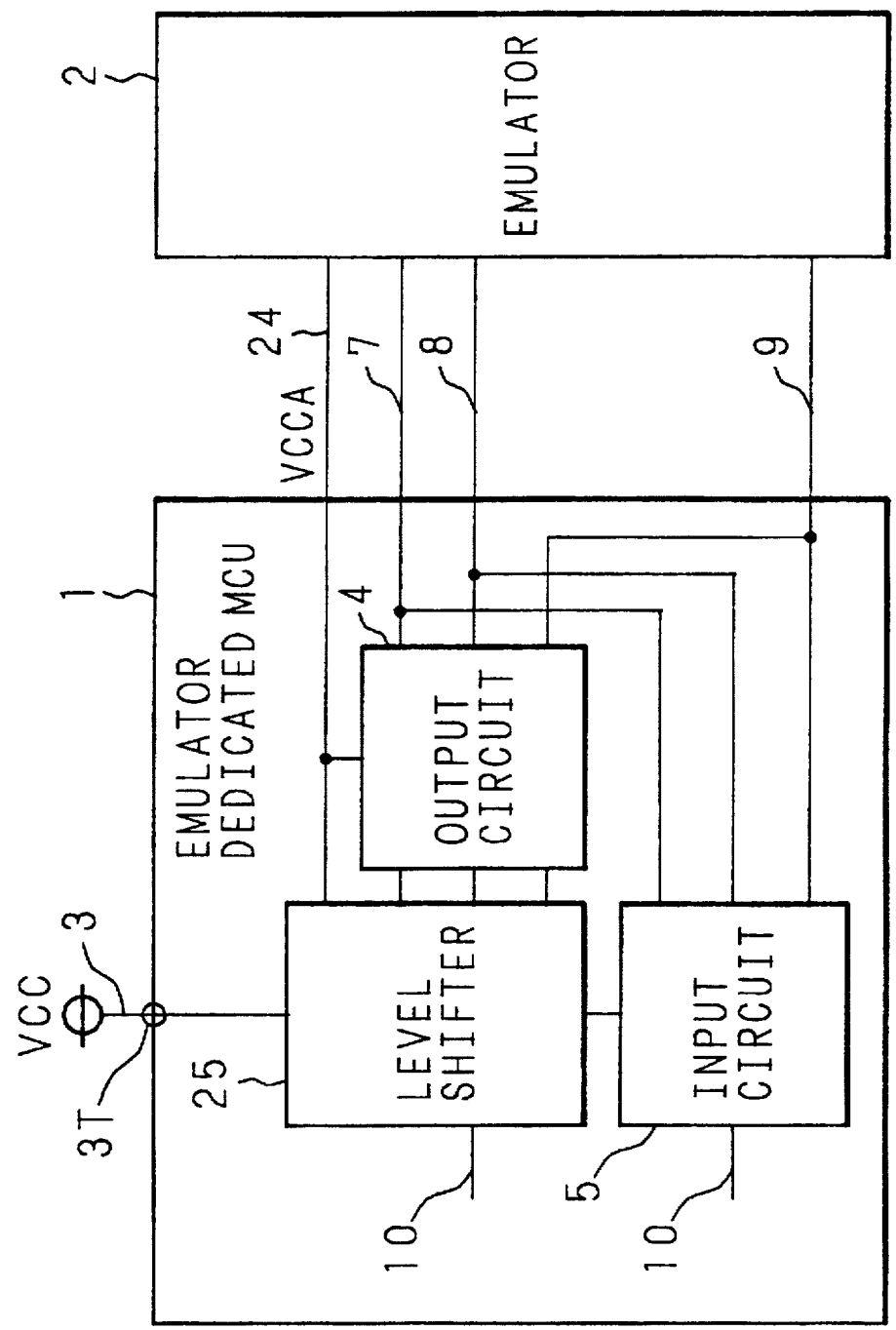
FIG. 2 is a block diagram showing a configuration example of the first embodiment of an emulator dedicated one-chip microcomputer according to this invention.

FIG. 2 is a block diagram showing a configuration example of the first embodiment of an emulator dedicated one-chip microcomputer (hereinafter called "emulator dedicated MCU") according to this invention.

In FIG. 2, numeral 1 denotes an emulator dedicated MCU according to the present invention, 2 an emulator, and 3 a feeder which feeds the external power supply VCC to the emulator dedicated MCU 1 from the outside via the terminal 3T, respectively.

In the emulator dedicated MCU 1, various internal circuits (CPU, etc.) similar to those of general MCUs, a level shifter 25, an output circuit 4 and an input circuit 5 are built in. Various internal circuits are connected to the output circuit 4 via the level shifter 25 with a bus (hereinafter called the "internal circuit bus") for various signals shown by numeral 10 and are directly connected to the input circuit 5.

The emulator dedicated MCU 1 and the emulator 2 are connected with signal lines shown by numerals 7, 8 and 9. Numeral 7 shows a data bus for carrying out intercommunication between the emulator dedicated MCU 1 and the emulator 2, 8 an address buss for carrying out intercommunication between the emulator dedicated MCU 1 and the emulator 2, and 9 bus for various control signals (hereinafter called the "control signal bus") for carrying out intercommunication between the emulator dedicated MCU 1 and the emulator 2.

It is assumed that the emulator dedicated MCU 1 is mounted on an evaluation substrate or prototype substrate and the external power supply VCC is supplied from the evaluation substrate or the prototype substrate via the feeder 3 and the terminal 3T of the emulator dedicated MCU 1.

Numeral 24 denotes a feeder of the power supply VCCA (hereinafter called the "emulator power supply") which is supplied from the emulator 2 to the emulator dedicated MCU 1. The emulator power supply VCCA supplied to the emulator dedicated MCU 1 via this feeder 24 has the voltage level same as the voltage level at which the emulator 2 operates. In the embodiment shown in FIG. 2, the emulator power supply VCCA is supplied from the emulator 2 to the emulator dedicated MCU 1, but if the voltage level same as the voltage level at which the emulator 2 operates is supplied, it may be supplied from a completely independent power supply. The level shifter 25, which will be later described in detail, is configured to switch the voltage of the external power supply VCC at 1.8V to the voltage of the emulator power supply VCCA at 5V in this embodiment.

Figure 1:
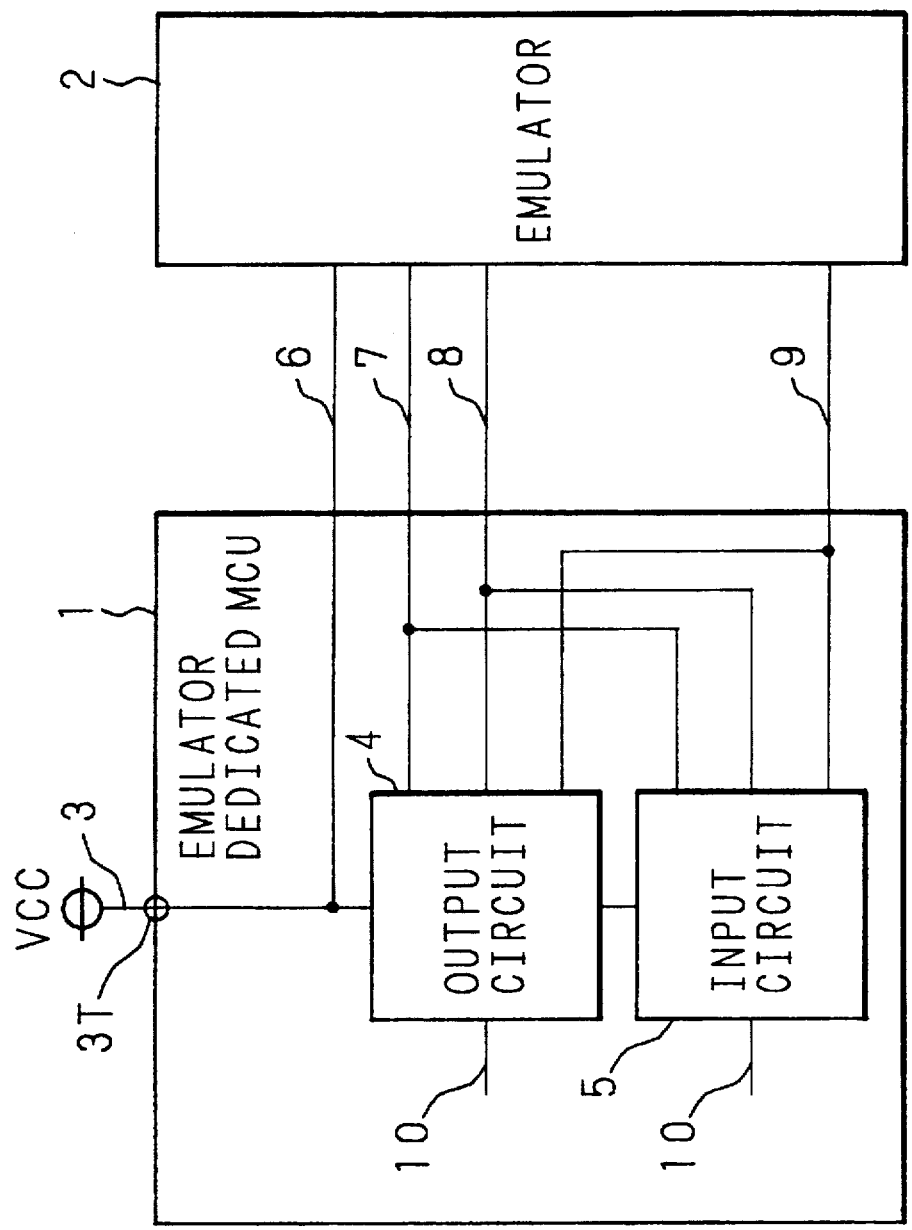
FIG. 1 is a block diagram showing a configuration example of a conventional emulation system.

In the conventional embodiment shown in FIG. 1 above-described, to the output circuit 4, the power supply voltage is supplied from the external power supply VCC, but in the first embodiment of the emulator dedicated one-chip microcomputer of the present invention shown in FIG. 2, the power supply voltage of 5V is supplied from the emulator power supply VCCA to the output circuit 4.

The number of bits of the output circuit 4 and input circuit 5 should correspond to the number of data, address and control signals to be inputted and outputted to and from the emulator 2, respectively, and the number of bits of the level shifter 25 should correspond to the number of control signals required for the output circuit 4 and the number of data, address and control signals to be outputted to the emulator 2.

Next, description will be made on the operation of the emulation system to which the emulation dedicated one-chip microcomputer of the first embodiment of the present invention having the configuration described above. On the emulator 2, a program for MCU to be mounted on actual products is loaded from a flexible disc, etc. In order for the emulator dedicated MCU 1 to execute the program loaded to the emulator, the program must be taken into the emulator dedicated MCU 1 itself, and therefore, the description will be made on this operation at first.

Description will be given on the operation for executing an instruction when the instruction for fetching the data stored in an address of the memory to CPU is included in the above program. First of all, the instruction is out-putted from the emulator 2, and the emulator dedicated MCU 1 receives the instruction from the interface built in in place of the ROM. With this operation, in the same way as in the case where a general MCU reads the instruction from ROM for execution, the emulator dedicated MCU 1 can execute the instruction received from the interface.

Specifically, from the emulator dedicated MCU 1, the address of the data to be processed is outputted from the interface via the internal circuit bus 10, the level shifter 25, the output circuit 4 and the address bus 8, and inputted to the emulator 2 in order to execute the instruction received from the interface. At this time, the control signal is also outputted via the internal circuit bus 10, the level shifter 25, the output circuit 4 and the control signal bus 9, and inputted to the emulator 2. The emulator 2 received the address and control signals outputs the data stored in the address. This data is fetched into a CPU (not illustrated) of the emulator dedicated MCU via the data bus 7, the input circuit 5 and the internal circuit bus 10. The above-described operation is executed in one cycle of the internal clock 1 of the emulator dedicated MCU 1.

By repeating these operations, the program is executed in the same manner as in case of the above-mentioned conventional example. Only difference in operation between the first embodiment of this invention and the above-mentioned conventional example is that the signal passes the level shifter 25 when the signal is outputted from the emulator dedicated MCU 1 to the emulator 2 and the operation under normal condition is not at all different from that of the conventional example.

However, the effects of the level shifter 25 is demonstrated when the external power supply VCC is low, around 1.8V, for example. This is because there is a difference in drive capabilities of the output circuit 4 shown in FIG. 2 at the time of 1.8V and 5V. Because the driving capabilities at 5V are greater than those at 1.8V, the delay time is small. It is no longer necessary to detect the delay time in accordance with the external power supply voltage as in case of the conventional example and the internal construction of the emulator 2 can be simplified. In addition, with respect to the device used for the emulator 2, because such device that operates near the voltage of emulator power supply VCCA is only needed, the device is not necessarily operable at all voltages from 1.8V to 5.5V, achieving another effect that a comparatively inexpensive device can be used.

Figure 3:
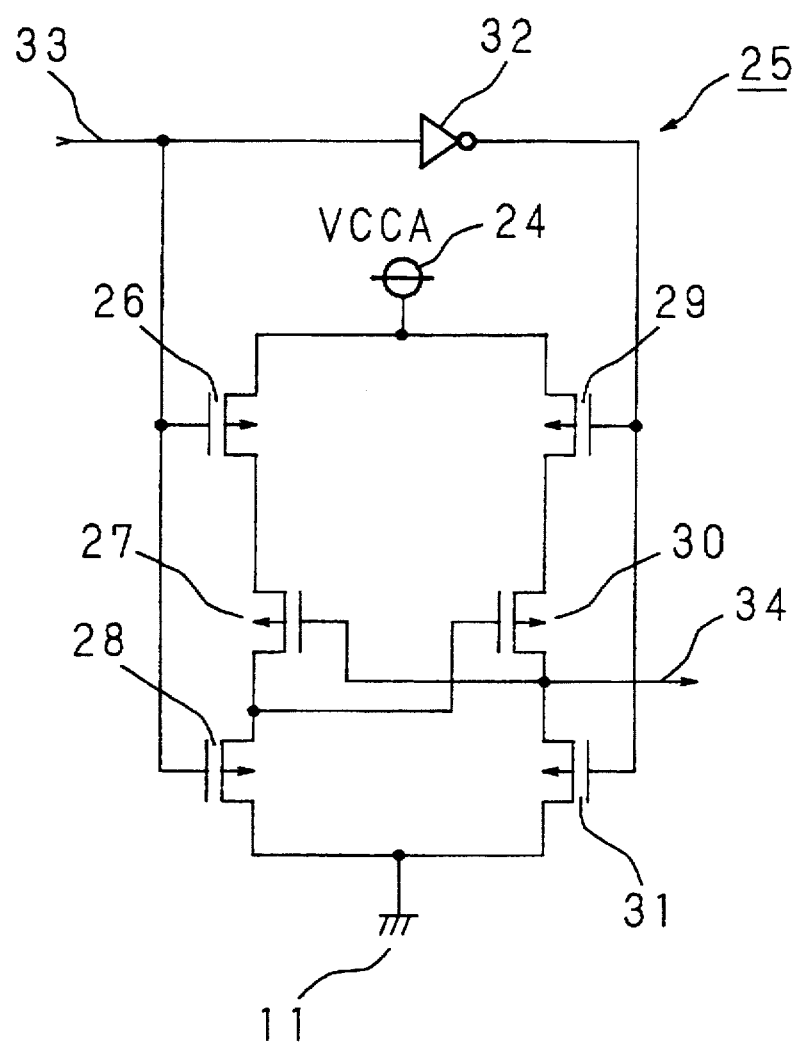
FIG. 3 is a circuit diagram showing a configuration example of a portion corresponding to one bit of a level shifter of the first embodiment of an emulator dedicated one-chip microcomputer according to this invention.

FIG. 3 is a circuit diagram showing a configuration example of a portion corresponding to one bit of the level shifter 25 shown in FIG. 2. In FIG. 3, numeral 11 denotes a grounding, 24 a feeder for feeding emulator power supply VCCA from the emulator 2 to the emulator dedicated MCU 1, 28, 27, 29 and 30 P-channel enhancement MOS transistors (hereinafter called "Pch transistors"), 28 and 31 N-channel enhancement MOS transistors (hereinafter called "Nch transistors"), 32 an inverter to which the power supply voltage is given from the external power supply VCC, 33 an input signal to the level shifter 23 (hereinafter called the "level shifter input signal"), and 34 an output signal from the level shifter 25 (hereinafter called the "level shifter output signal"), respectively.

The level shifter input signal 33 is inputted to the inverter 32, a gate of the Pch transistor 26 and a gate of the Nch transistor 28. An output signal of the inverter 32 is inputted to a gate of the Pch transistor 29 and a gate of the Nch transistor 31. To the emulator power supply VCCA, a source of the Pch transistor 26 is connected, to a source of the Pch transistor 27, a drain of the Pch transistor 26 is connected, to a drain of the Nch transistor 28, a drain of the Pch transistor 27 is connected, and to a source of the Nch transistor 28, the grounding 11 is connected. Also, to the emulator power supply VCCA, a source of the Pch transistor 29 is connected, to a source of the Pch transistor 30, a drain of the Pch transistor 29 is connected, to a drain of the Nch transistor 31, a drain of the Pch transistor 30 is connected, and to a source of the Nch transistor 31, the grounding 11 is connected. Furthermore, to a gate of the Pch transistor 30, a drain of the Pch transistor 27 and the drain of the Nch transistor 28 are connected, and to the gate of the Pch transistor 27, the drain of the Pch transistor 30 and the drain of the Nch transistor 31 are connected. The output signal from the connection node between the drain of the Pch transistor 30 and that of the Nch transistor 31 becomes the level shifter output signal 34.

The level shifter input signal 33 is connected to the internal circuit bus 10 shown in FIG. 2, and the level shifter output signal 34 is connected to any of the data bus 7, the address bus 8 or the control signal bus 9 shown in FIG. 2.

Next, explanation will be made on the operation of the level shifter 25 shown in FIG. 3. First of all, description will be made on the case where the level shifter input signal 33 is "0" In this case, since the inverter 32 outputs a inverted signal ("1") of the level shifter input signal 33, the Nch transistor 31 turns on, and by this operation, the voltage level of grounding 11 is outputted as the level shifter output signal 34 of "0" On the other hand, when the level shifter input signal 33 is "1", the Nch transistor 28 turns on. By this operation, the gate potential of the Pch transistor 30 becomes "0", and then, the Pch transistor 30 also turns on. Because the inverted signal ("0") of the level shifter input signal 33 is outputted from the inverter 32, the Pch transistor 29 turns on. With these conditions, to the level shifter output signal 34, the voltage level of the emulator power supply VCCA is outputted as "1"

Figure 4:
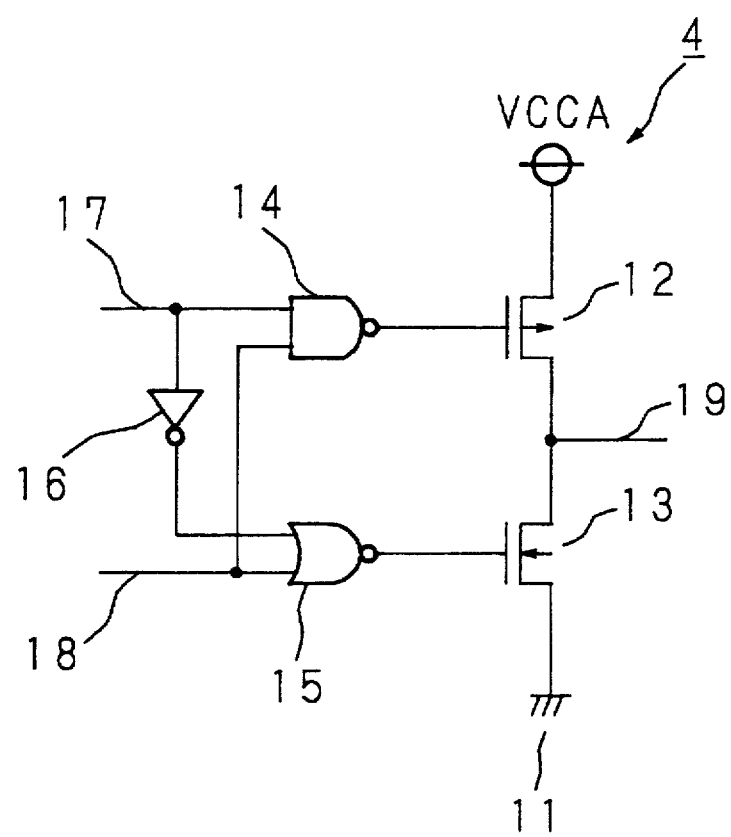
FIG. 4 is a circuit diagram showing a configuration example of a portion corresponding to one bit of an output circuit of the first embodiment of an emulator dedicated one-chip microcomputer according to this invention.

FIG. 4 is a circuit diagram showing a configuration example of a portion corresponding to 1 bit of the output circuit 4 shown in FIG. 2. In FIG. 4, reference symbol VCCA denotes the emulator power supply VCCA which is supplied from the emulator 2 to the emulator dedicated MCU 1, 11 the grounding, 12 a Pch transistor, 13 an Nch transistor, 14 a NAND gate, 15 a NOR gate, 16 an inverter, 17 an output control signal, 18 a data signal, and 19 an output signal of the output circuit 4 (hereinafter called "output circuit output signal"), respectively.

The output circuit output signal 19 should be connected to any of the data bus 7, the address bus 8 and the control signal bus 9, and the output control signal 17 and the data signal 18 should be connected to the internal circuit bus 10 shown in FIG. 2, respectively.

To one input terminal of the NAND gate 14, the output control signal 17 is inputted and to the other input terminal, the data signal 18 is inputted, and an output signal of the NAND gate 14 is inputted to a gate of the Pch transistor 12. To one input terminal of the NOR gate 15, the output control signal 17 is inputted via the inverter 16, and to the other input terminal, the data signal 18 is inputted, while an output signal of the NOR gate 15 is inputted to a gate of the Nch transistor 13. A source of the Pch transistor 12 is connected to the emulator power supply VCCA and a source of the Nch transistor 13 is connected to the grounding 11, respectively. And a drain of the Pch transistor 12 and a drain of the Nch transistor 13 are connected with each other, and the signal of the connection node becomes the output circuit output signal 19.

To the Pch transistor 12 and Nch transistor 13, the emulator power supply VCCA is supplied as described above, but to the NAND gate 14, the NOR gate 15 and the inverter 16, the external power supply VCC is supplied via the input terminal 3T from the outside of the emulator dedicated MCU 1.

Next, description will be made on the operation of the portion corresponding to one bit of the output circuit 4 shown in FIG. 4. When both control signal 17 and data signal 18 are "1", the outputs of NAND gate 14 and NOR gate 15 are "0". In this case, because the Pch transistor 12 turns on and the Nch transistor turns off, to the output circuit output signal 19, the voltage level of the emulator power supply VCCA is outputted as "1". When the control signal 17 is "1" and the data signal 18 is "0", the outputs of NAND gate 14 and NOR gate 15 are "1". In this case, the Pch transistor 12 turns off and the Nch transistor 13 turns on, and therefore, to the output circuit output signal 19, the voltage level of the grounding 11 is outputted as "0". When the control signal 17 is "0", both the Pch transistor 12 and the Nch transistor 13 turn off and therefore, the output circuit output signal 19 becomes high-impedance state.

[Second Embodiment]

Figure 5:
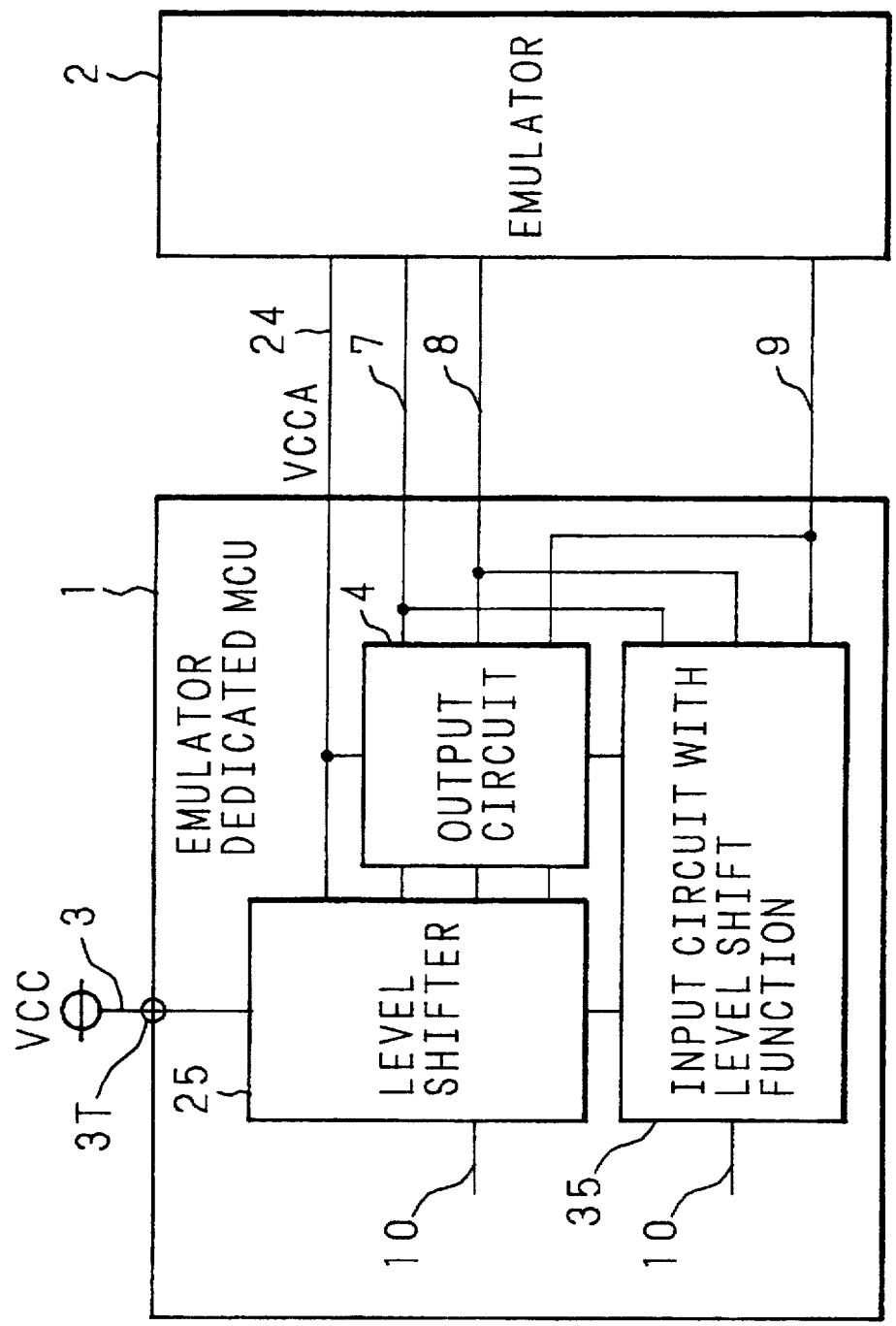
FIG. 5 is a block diagram showing a configuration example of the second embodiment of an emulator dedicated one-chip microcomputer according to this invention.

FIG. 5 is a block diagram showing a configuration of the second embodiment of the emulator dedicated one-chip microcomputer according to this invention. In FIG. 5, except the fact that an input circuit with level shift function shown by numeral 35 is provided in place of the input circuit shown by numeral 5, all other component elements are in the same configuration as that shown in FIG. 2. The input circuit 35 with level shift function has a function of the input circuit 5 shown in FIG. 2 as well as a function to switch voltage 5V of the emulator power supply VCCA to and from voltage 1.8V of the external power supply VCC.

In the conventional example shown in FIG. 1, to the output circuit 4, the power supply voltage is supplied from the external power supply VCC, but in the second embodiment of the emulator dedicated one-chip microcomputer of the present invention shown in FIG. 5, the power supply voltage of 5V is supplied from the emulator power supply VCCA to the output circuit 4.

The number of bits of the output circuit 4 and input circuit 35 with level shift function should correspond to the number of data, address and control signals to be inputted and outputted to and from the emulator 2, respectively, and the number of bits of the level shifter 25 should correspond to the number of control signals required for the output circuit 4 and the number of data, address and control signals to be outputted to the emulator 2.

Next, explanation will be made on the operation of the emulation system in which the emulator dedicated one-chip microcomputer of the second embodiment according to the present invention having the above-described configuration is built in when the instructions of the program are executed in the same manner as that in the above-mentioned conventional example and the first embodiment.

When the emulator dedicated MCU 1 receives an instruction, the address of the data to be processed is outputted via the internal circuit bus 10, the level shifter 25, the output circuit 4 and the address bus 8, and is inputted into the emulator 2 in order to execute the instruction. At this time, the control signal is also outputted via the internal circuit bus 10, the level shifter 25, the output circuit 4 and the control signal bus 9, and is inputted into the emulator 2. The emulator 2 which received the address and the control signals outputs the data stored in the address. This data is fetched into a CPU (not illustrated) of the emulator dedicated MCU via the data bus 7, the input circuit 35 with level shift function, and the internal circuit bus 10. The above-described operation is executed in one cycle of the internal clock of the emulator dedicated MCU 1.

By repeating these operations, the program is executed in the same manner as in the case of the above-mentioned conventional example. Only difference in operation between the second embodiment of this invention and the first embodiment of this invention is that the signal passes the input circuit 35 with level shift function in place of the input circuit 5 when signal is inputted from the emulator 2 to the emulator dedicated MCU 1 and the operation under normal condition is not at all different from that of the first embodiment.

By the way, in the operation of the aforementioned first embodiment, when "0" is inputted from the emulator 2 to the emulator dedicated MCU 1, the following problem occurs. As shown in FIG. 5, because the power supply voltage is supplied from the external power supply VCC to the inverter 20 of the conventional input circuit 5, "0" is not recognized unless the output voltage from the emulator 2 lowers below 0.9V when the threshold voltage is assumed to be 0.9V in the case where the external power supply VCC is 1.8V. In other words, when noise exceeding 0.9V is generated between the emulator dedicated MCU 1 and the emulator 2, the input circuit 4 outputs "1" to the internal circuit bus 10, causing maloperation. The circuit to counteract this problem is the input circuit 35 with level shift function.

Figure 6:
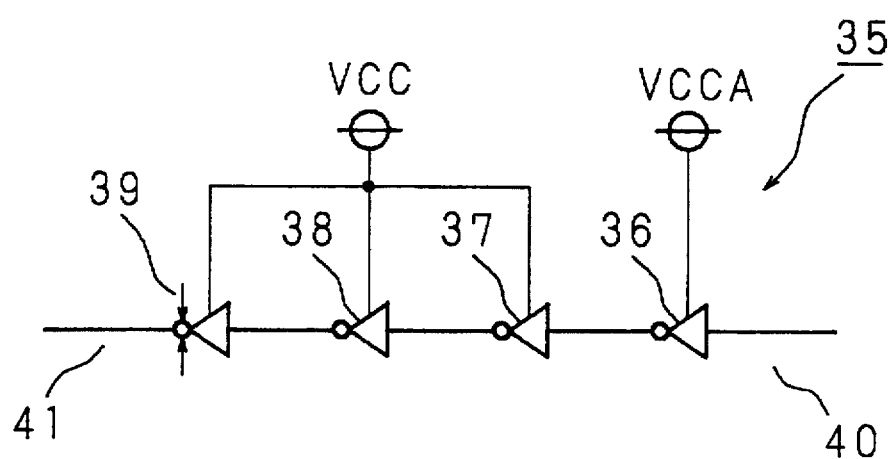

FIG. 6 is a circuit diagram showing a configuration example of the input circuit 35 with level shift function shown in FIG. 5. In FIG. 6, numeral 38 denotes an inverter which is given the emulator power supply VCCA as an operation power supply, 37 an inverter which is given the external power supply VCC as an operation power supply, 38 an inverter which is given the external power supply VCC as an operation power supply, 39 a clocked inverter which is given the external power supply VCC as an operation power supply, 40 an input signal (hereinafter called the "input circuit input signal") to the input circuit 35 with level shift function, and 41 an output signal (hereinafter called the "input circuit output signal") from the input circuit 35 with level shift function, respectively. The input circuit input signal 40 is connected to the data bus 7, the address bus 8 and the control signal bus 9 shown in FIG. 5, while the input circuit output signal 41 is connected to the internal circuit bus 10 shown in FIG. 5. A control signal of the clocked inverter 39 is a signal supplied from the internal circuit bus 10 shown in FIG. 5 and the clocked inverter 39 receives the input signal only when signal input is permitted.

Next, explanation will be made on the operation of the input circuit 35 with level shift function. When signal input to the clocked inverter 39 is permitted, the input circuit input signal 40 is inverted by the inverter 36, inverted by the inverter 37, inverted by the inverter 38, and further inverted and outputted by the clocked inverter 39. When signal input to the clocked inverter 39 is not permitted, the input circuit input signal 40 is not to be transmitted to the input circuit output signal 41.

In this way, because in the second embodiment, the voltage level of the input signal is varied in the emulator dedicated MCU in addition to the above-mentioned first embodiment, influences of noise between the emulator dedicated MCU 1 and the emulator 2 can be eliminated As set forth hereinabove, according to the emulator dedicated one-chip microcomputer of this invention, debugging of the microcomputer operating at low voltage becomes possible, in which debugging of the program has been impossible with the emulator used, thereby simplification of the emulator inside and reduction of costs can be realized.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An emulator dedicated one-chip microcomputer operating by supplying an external power supply from the outside, comprising:

a plurality of signal lines for transmitting and receiving signals to and from an emulator which holds a program to be developed;

an internal circuit for processing said program to be developed;

an internal circuit bus connected to said internal circuit;

an output circuit for outputting signals, which are outputted from said internal circuit to said internal circuit bus, to said plurality of the signal lines; and an input circuit for inputting signals, which are outputted from said emulator to said plurality of the signal lines, to said internal circuit bus;

wherein a program of the one-chip microcomputer is developed by fetching the program held in said emulator via said plurality of the signal lines, said input circuit and said internal circuit bus, and processing it by said internal circuit, and outputting the results to said emulator via said internal circuit bus, said output circuit and said plurality of the signal lines, said emulator dedicated one-chip microcomputer characterized in that a power supply of a second voltage level, equivalent to the voltage level at which said emulator operates and different from a first voltage level of said external power supply, is supplied from the outside, a level shifter, to which the external power supply of said first voltage level and the power supply of said second voltage level are supplied, for converting the voltage level of the signals given from said internal circuit bus to said output circuit from said first voltage level to said second voltage level when said output circuit outputs the signals on said internal circuit bus to said emulator via said plurality of the signal lines, is provided, and said output circuit operates by supplying the power supply of said second voltage level.

2. The emulator dedicated one-chip microcomputer as set forth in claim 1, wherein said first voltage level is 1.8V and said second voltage level is 5V.

3. An emulator dedicated one-chip microcomputer operating by supplying an external power supply from the outside, comprising:

a plurality of signal lines for transmitting and receiving signals to and from an emulator which holds a program to be developed;

an internal circuit for processing said program to be developed;

an internal circuit bus connected to said internal circuit;

an output circuit for outputting signals, which are outputted from said internal circuit to said internal circuit bus, to said plurality of the signal lines; and an input circuit for inputting signals, which are outputted from said emulator to said plurality of the signal lines, to said internal circuit bus;

wherein a program of the one-chip microcomputer is developed by fetching the program held in said emulator via said plurality of the signal lines, said input circuit and said internal circuit bus, and processing it by said internal circuit, and outputting the results to said emulator via said internal circuit bus, said output circuit and said plurality of the signal lines, said emulator dedicated one-chip microcomputer characterized in that a power supply of a second voltage level, equivalent to the voltage level at which said emulator operates and different from a first voltage level of said external power supply, is supplied from the outside, a level shifter, to which the external power supply of said first voltage level and the power supply of said second voltage level are supplied, for converting the voltage level of the signals given from said internal circuit bus to said output circuit from said first voltage level to said second voltage level when said output circuit outputs the signals on said internal circuit bus to said emulator via said plurality of the signal lines, is provided, said output circuit operates by supplying the power supply of said second voltage level, and said input circuit is supplied with the external power supply of said first voltage level and the power supply of said second voltage level, and has a level shift function which shifts the voltage of signals from said second voltage level to said first voltage level and outputs it to said internal circuit bus when the signals on said plurality of signal lines are inputted.

4. The emulator dedicated one-chip microcomputer as set forth in claim 3, wherein said first voltage level is 1.8V and said second voltage level is 5V.

* * * * *